June 30, 1970 L. W. WIGHTMAN 3,518,468
ELECTRIC MOTOR COOLING CONSTRUCTION
Filed Nov. 14, 1968
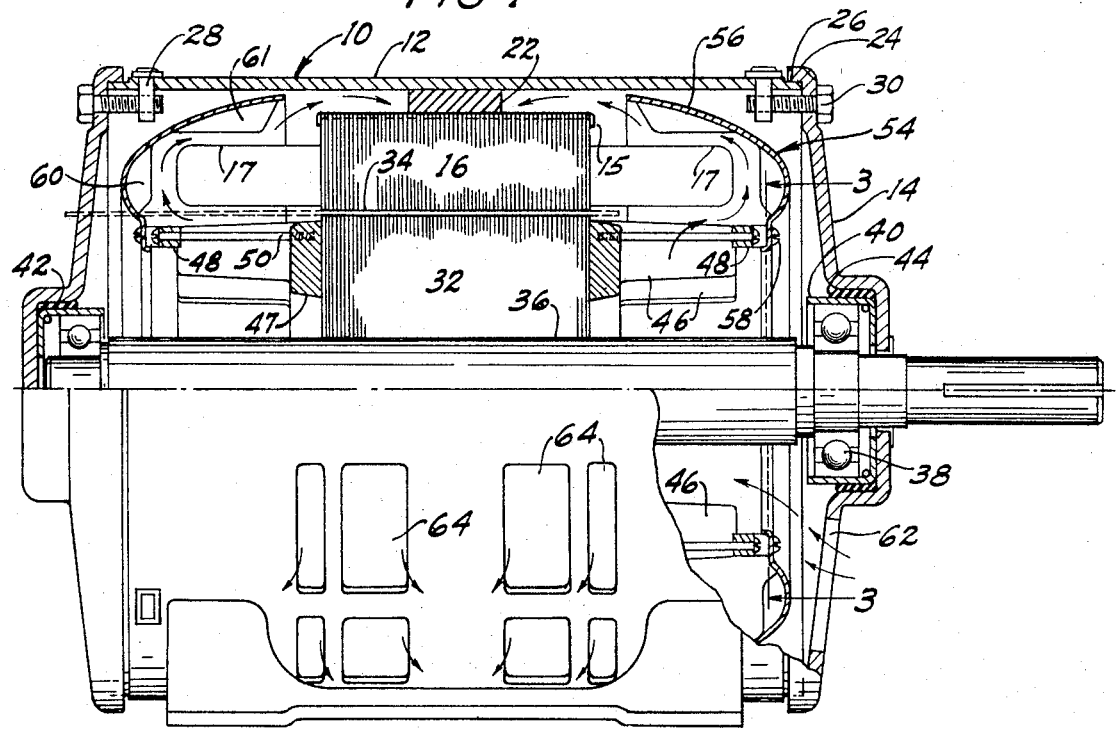
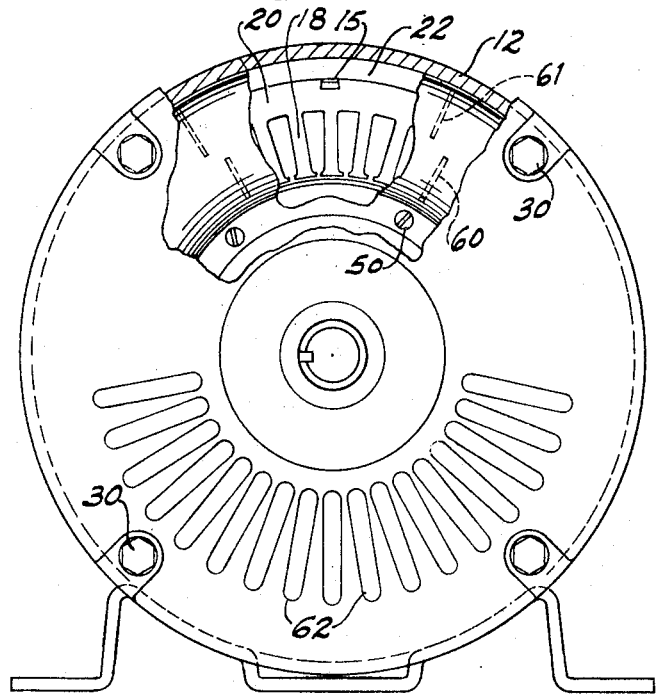
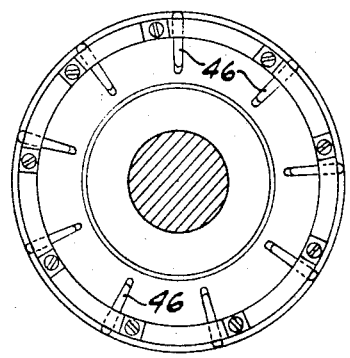
INVENTOR
LAWRANCE W. WIGHTMAN
BY Charles E. Markham
HIS AGENT United States Patent Office 3,518,468
Patented June 30, 1970

3,518,468
ELECTRIC MOTOR COOLING CONSTRUCTION
Lawrance W. Wightman, St. Louis County, Mo., assignor to Emerson Electric Co., St. Louis, Mo., a corporation of Missouri
Filed Nov. 14, 1968, Ser. No. 775,724
Int. Cl. H02k 9/06
U.S. Cl. 310—63
2 Claims

ABSTRACT OF THE DISCLOSURE

An electric motor in which a stator having a circular periphery is fixed at its central portion in a stator shell of larger inside diameter, leaving substantial end portions of the stator spaced from the stator shell, and in which cooling air is caused to flow at high velocity in a circular path over the peripheral surfaces of these stator end portions by large diameter blowers.

---

This invention relates to dynamoelectric machines and particularly to stator and stator shell construction and cooling means for electric motors.

Heretofore, conventional constructions of larger size electric motors have employed axially extending ribs for spacing the stator yoke from the shell. These ribs were either formed integral with a cast stator shell, or welded to a steel shell, or they were formed as integral radial extensions of the laminated stator core. While these axial ribs spaced segmental portions of the peripheral surface of the stator yoke from the shell wall, over which cooling air could be passed, and further provided internal slots outside the periphery of the yoke for the passage of end shield attaching through bolts, they were, nevertheless, expensive and limited to the flow of cooling air over the periphery of the stator and interrupted the circular flow of air around the shell wall.

In order to improve the flow of cooling air over these exposed, segmental, peripheral portions of the stator, long, axial, air exit slots were provided in the shell wall between the ribs in some constructions. This provision added further cost, however, inasmuch as such slots were required to be hooded to prevent moisture from dripping into the casing, and the shell needed reinforcing to reduce vibration and noise when the slots were made long enough to effectively increase the air flow.

I have found that substantially lower operating temperature can be achieved, with less costly construction, by eliminating the end shield attaching through bolts and axially extending ribs between the stator yoke and wall of the shell so as to permit the free circular flow of air over substantial portions of the stator and wall of the shell.

Accordingly, it is an object of this invention to provide an electric motor in which a stator is fixed at an intermediate portion of its length in a cylindrical shell of larger inside diameter in a manner to space substantial end portions of the stator from the shell wall, whereby cooling air may be caused to flow freely in an uninterrupted circular path over the peripheries of these stator end portions and the adjacent surfaces of the shell wall.

A further object is to provide an electric motor in which a stator having a circular periphery is fixed in a cylindrical shell of larger inside diameter by a rigid band member press fitted on the stator and press fitted into the shell, which band member is centrally positioned on said stator and is of such width that substantial end portions of said stator have their peripheries spaced from the shell wall.

A further object is to provide an electric motor in which the central portion of the periphery of the stator is fixed in the surrounding wall of a cylindrical stator shell of larger inside diameter leaving substantial end portions of the stator exposed in spaced relationship with the shell wall, in which rotor supporting end shields are detachably connected to the ends of the stator shell by removable lugs and short bolts, in which the end shields and the lower half of the stator shell have air vents, and in which large diameter rotor-driven blowers at each end of the motor, between the ends of the stator and the ends of the end shields, cause air to flow at high velocity into the motor casing through the end shields and to circulate freely over the peripheries of the exposed end portions of the stator and the adjacent wall of the shell and exhaust through the vents in the lower portion of the shell.

With these and other objetcs in view my invention consists in the construction, arrangement, and combination of the various parts whereby the objects contemplated are achieved, as hereinafter fully described, illustrated in the drawings, and set forth in the appended claims.

In the drawing:

FIG. 1 is a half sectionalized, side elevational view of an A.C. electric motor constructed in accordance with the present invention;

FIG. 2 is an end elevational view of the electric motor shown in FIG. 1 with part of one end shield and blower broken away to show portions of the stator and mounting ring; and FIG. 3 is an end view of the rotor taken along line 3—3 of FIG. 1.

The motor has a casing 10 comprising a cylindrical stator shell 12 and a pair of end shields 14 detachably connected to the ends of the shell 12. The shell is preferably formed of heavy steel sheet stock by rolling and seam welding. Fixed in the shell 12 is a stator comprising a laminated core 16 and windings 17, the end turns of which are shown extending axially from the end faces of the core 16. The core laminations are held firmly together by conventional cleats 15, and after the windings are assembled, the entire stator is bonded at elevated temperature in a conventional manner, during which process the bonding resin enters between the laminations, securely cementing them together.

The stator core has circularly arranged pole pieces 18 joined by a yoke 20, the periphery of which is an uninterrupted circle. The outside diameter of the stator yoke 20 is smaller than the inside diameter of shell 12 and has press fitted thereon a thick steel band 22, which band, in turn, is press fitted into the shell 12 and fixed therein in any suitable manner, as by welding.

The band 22 is positioned intermediately of the ends of the stator core and its width is considerably less than the length of the stator core so that end portions of the stator core of substantial length have their peripheries spaced from the shell wall. The shell 12 is also considerably longer than the stator core and the core is positioned intermediately of the ends of the shell, thereby spacing the end shields from the ends of the stator.

The end shields 14 are provided with rims 24 which fit nicely over machined surfaces 26 at the ends of the shell. The end shields are detachably connected to the shell by removable lugs 28 entered radially into the casing through suitable perforations and having tapped holes therein to receive short bolts 30 passing through clearance holes in end shields 14. This method of detachably connecting the end shields permits the axial entry or removal of the stator or the mounting bands 22 and provides unobstructed annular spaces at each end of the stator extending to the wall of the shell in which large diameter blowers may be operated.

The motor further includes a rotor 32 mounted for rotation in a stator bore 34. The rotor has a shaft 36 on the end portions of which are press fitted ball bearings 38. The ball bearings are slip fitted into bearing locating rings 40, which rings are, in turn, loosely fitted into and cemented in recesses 42 in the end shields by an adhesive structural cement 44.

The rotor is provided with circularly arranged, radial, blower vanes 46 cast integral with rotor end rings 47 extending axially outward from the ends of the rotor. Overlying the outer ends of vanes 46 are ring members 48 held rigidly against the ends of the vanes by long bolts 50 screw threaded into tapped holes in rotor end rings 46. A pair of large diameter blowers, generally indicated at 54, also rotate in the spaces betwen the ends of the stator and the end shields. The blowers 54 each comprise an annulus 56 attached at its inner edge to the ring members 48 by screws 58 and having an outside diameter just sufficiently slightly smaller than the inside diameter of stator The annuluses 56 are of generally concavo-convex, cross sectional configuration with the concave sides facing the ends of the stator, and they are provided with circularly arranged radial vanes 60 and 61 extending across portions of the concave sides. Cooling air is drawn into the casing through vents 62 in the lower halves of the end shields and is caused to flow radially across the end faces of the rotor. The greater portion of this radial flow is then deflected axially outward by the end turns of the stator windings and is then directed back over the winding end turns and over the peripheral surfaces of the exposed stator end portions and the adjacent shell wall by the annulus members 56 at greatly increased velocity. Upon encountering the end faces of the stator and the mounting band 22, the air is forced to flow in a circular path and exhausts through vents 64 in the lower half of the stator shell.

By confining the air vents to the lower halves of the beveled end shields and the lower half of the cylindrical stator shell, the requirements for drip-proof service are met without the provision of means to hood the air vents. The mounting band 22 could obviously be replaced by making the yoke portion of a central stack of laminations larger in diameter than that of the lamination stacks forming the end portions of the stator. This means of spacing end portions of the stator from the shell wall to facilitate cooling would, however, be more costly and considerably less rigid than the illustrated steel band.

The motor is assembled by press fitting the band 22 on the stator periphery and then either press fitting or shrink fitting the band in the shell 12. Thereafter, the rotor, with the ball bearings fixed on the shaft and the bearing locating rings 40 slip fitted on the bearings, is entered and fixed concentrically and axially in the stator bore by means of suitable shims 66. The cement 44, in paste form, is now applied to the outer surfaces of locating rings 40, and the end shields 14 are then moved axially into assembled position with rim portions 24 fitted on machined surface 26. Heat is now applied to harden the cement 44, thereby rigidly fixing the loosely fitting locating rings 40 in axial alignment in end shield recesses 42.

One end shield is now removed to permit withdrawal of shims 66 and the attachment of the one annulus 56. After this is done the one end shield is again assembled and lugs 28 and bolts 30 asembled and tightened. As an alternative, suitable perforations may be made in one annulus and one end shield to permit withdrawal of the shims without removing the end shield.

I claim:

1. In an electric motor, a casing including a cylindrical stator shell, a stator of circular periphery and of smaller diameter than the inside diameter of said shell, a rigid, relatively thick, metal band press fitted on said stator and fixed in said stator shell, said band having a width considerably less than the length of said stator and surrounding a central portion of said stator and fixing said stator in said shell and spacing substantial end portions thereof from the wall of said shell, and means circulating cooling air over the peripheries of said spaced stator end portions.

2. An electric motor as set forth in claim 1 which further includes a rotor including a shaft mounted for rotation in said stator, in which said casing includes end walls journalling the rotor shaft, in which said end walls are provided with air vents, in which said stator shell is provided with air vents circularly spaced around a portion of the periphery thereof and coextending with said spaced end portions of said stator, and in which rotor-driven blowers in said casing at both ends of said motor cause air to flow into said casing through said end wall vents, over the peripheries of said spaced end portions of said stator, and outward through said vents in said shell wall.

References Cited

UNITED STATES PATENTS

| | | | |
|---|---|---|---|
| 1,446,898 | 2/1923 | Gysel | 310—64 X |
| 1,803,570 | 5/1931 | Uggla | 310—62 |
| 1,858,261 | 5/1932 | Barnholdt | 310—63 |

FOREIGN PATENTS 560,135 9/1932 Germany.

DONOVAN F. DUGGAN, Primary Examiner

U.S. Cl. X.R.

310—64, 258